(12) United States Patent
Yang et al.

(10) Patent No.: US 11,159,266 B2
(45) Date of Patent: Oct. 26, 2021

(54) ADAPTIVE CHANNEL ACCESS

(71) Applicant: Apple Inc., Cupertino, CA (US)

(72) Inventors: Xi Yang, Sunnyvale, CA (US); Peter M. Agboh, Burlingame, CA (US); Qiyang Wu, Fremont, CA (US); Vusthla Sunil Reddy, Cupertino, CA (US); Shrenik Milapchand, San Jose, CA (US); Manjit S. Walia, San Jose, CA (US)

(73) Assignee: Apple Inc., Cupertino, CA (US)

( * ) Notice: Subject to any disclaimer, the term of this patent is extended or adjusted under 35 U.S.C. 154(b) by 48 days.

(21) Appl. No.: 16/107,763

(22) Filed: Aug. 21, 2018

(65) Prior Publication Data

US 2020/0112385 A1  Apr. 9, 2020

Related U.S. Application Data

(60) Provisional application No. 62/662,154, filed on Apr. 24, 2018.

(51) Int. Cl.
*H04K 3/00* (2006.01)
*H04W 24/08* (2009.01)
*H04W 74/08* (2009.01)

(52) U.S. Cl.
CPC ............ *H04K 3/224* (2013.01); *H04W 24/08* (2013.01); *H04W 74/0816* (2013.01)

(58) Field of Classification Search
CPC ..... H04W 48/16; H04W 24/10; H04W 8/005; H04W 88/06
USPC .......................................................... 370/524
See application file for complete search history.

(56) References Cited

U.S. PATENT DOCUMENTS

| 8,369,782 B1* | 2/2013 | Lin ...................... H04B 7/2612 |
| | | 455/161.1 |
| 2006/0205349 A1* | 9/2006 | Passier .................... H04R 27/00 |
| | | 455/41.2 |
| 2013/0286937 A1* | 10/2013 | Liu ........................ H04W 48/16 |
| | | 370/328 |
| 2016/0242186 A1* | 8/2016 | Nissila ................... H04L 1/1893 |
| 2017/0171840 A1* | 6/2017 | Mukherjee .......... H04W 72/042 |
| 2018/0199300 A1* | 7/2018 | Bergstrom ............ H04W 56/00 |

* cited by examiner

*Primary Examiner* — Melvin C Marcelo
*Assistant Examiner* — Natali Pascual Peguero
(74) *Attorney, Agent, or Firm* — Morgan, Lewis & Bockius LLP (57) ABSTRACT

A device in an adaptive channel access system may include a processor that is configured initiate access of a channel, and perform a first jammer detection on the channel. The processor is configured to, when a jamming device is detected on the channel, access the channel with a channel occupancy time set to a first duration of time. The processor is configured to, when no jamming devices are detected: access the channel with the channel occupancy time set to the second duration of time that is greater than the first duration, while accessing the channel with the channel occupancy time set to the second duration of time, perform a second jammer detection on the channel, and when the jamming device is detected, cease to access the channel prior to the expiration of the second duration of time, otherwise continue to access the channel without re-initiating access of the channel.

21 Claims, 6 Drawing Sheets

ADAPTIVE CHANNEL ACCESS

CROSS-REFERENCE TO RELATED APPLICATIONS

The present application claims the benefit of U.S. Provisional Patent Application Ser. No. 62/662,154, entitled "Adaptive Channel Access," filed on Apr. 24, 2018, which is hereby incorporated by reference in its entirety for all purposes.

TECHNICAL FIELD

The present description relates generally to channel access, including adaptive channel access based on jammer detection.

BACKGROUND

Cellular technologies continue to evolve to increase the throughput of cellular communications. One such advancement, for example, is referred to as licensed assisted access (LAA), and involves utilizing the unlicensed 5 Gigahertz (GHz) spectrum for cellular communications, such as in addition to licensed cellular spectrum. However, the 5 GHz spectrum may also be used by WiFi communications, such as over wireless local area networks (WLANs), which may be coordinated independently of cellular communications. Since the cellular and WiFi communications are coordinated independently, interference may occur, for example, when a device utilizing LAA is within or near a WLAN, and/or is near a device utilizing WiFi communications.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The 5 GHz spectrum, which was previously utilized primarily for WiFi communications, will become increasingly congested as cellular technologies begin to utilize the 5 GHz spectrum for cellular communications, such as for LAA. Since WLAN and cellular communications are typically independent, interference may frequently occur unless effective coexistence mechanisms are in place. For example, a wireless standards setting organization may recommend and/or stipulate that the channel occupancy time for WiFi communications on 5 GHz channels be reduced, such as from 13 milliseconds (ms) to 6 ms, in order to accommodate concurrent cellular communications on 5 GHz channels. However, reducing the channel occupancy time may reduce WiFi throughput as a device may need to more frequently perform media/channel access procedures, back-offs, etc., such as every 6 ms instead of every 13 ms. The more frequent media/channel access procedures may be particularly wasteful when there are no concurrent cellular communications occurring.

In the subject system, when a device initiates media/channel access, the device performs a scan for energy on the channel, such as by performing jammer detection. If the device detects energy on the channel, the device sets the channel occupancy time for the channel access to a reduced duration of time (e.g., 6 ms) that may be, for example, stipulated by a standards setting organization. Alternatively, if the device does not detect any energy on the channel, the device may maintain the full channel occupancy time for the channel access, such as 13 ms. However, when accessing the channel with the full channel occupancy time, the device may again scan for energy on the channel after the expiration of the reduced duration of time, such as 6 ms into the 13 ms channel occupancy time. If energy is detected on the channel, the device may immediately turn off its transmit circuitry, so as to function as if the channel occupancy time had been set to the reduced duration of time. However, if no energy is detected on the channel, the device may continue to access the channel without having to re-perform the media/channel access procedures.

In this manner, the subject system allows devices to avoid unnecessary media/channel access procedures when no concurrent cellular communications are occurring on the 5 GHz spectrum, while also reducing the channel occupancy time when concurrent cellular communications are occurring on the 5 GHz spectrum. Thus, the subject system enables devices to comply with any reduced channel occupancy times that may be set/stipulated by any standards setting organizations, such as to mitigate interference with cellular communications over 5 GHz, without impacting WiFi throughput when no concurrent cellular communications on the 5 GHz spectrum are occurring.

Figure 1:
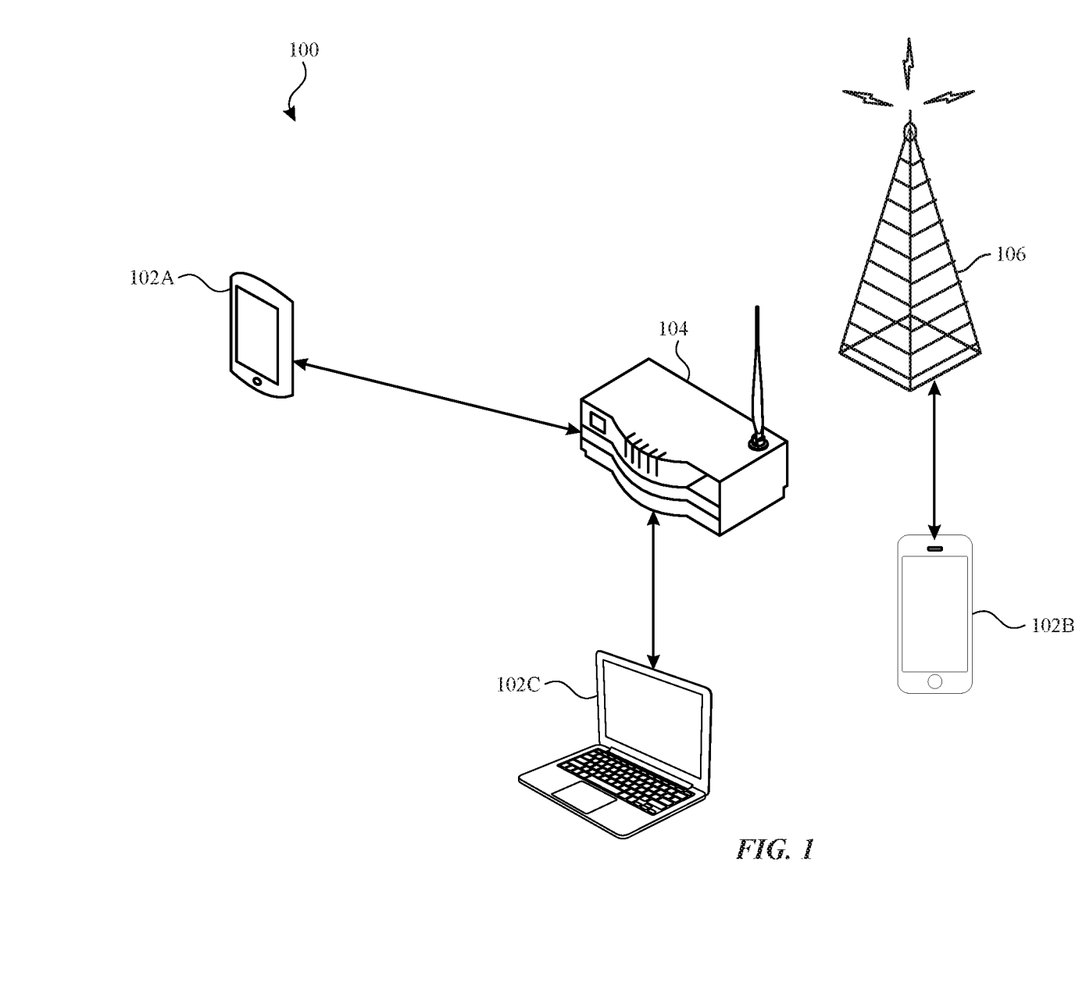
FIG. 1 illustrates an example network environment for adaptive channel access in accordance with one or more implementations.

FIG. 1 illustrates an example network environment 100 for adaptive channel access in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes one or more electronic devices 102A-C, a wireless access point 104, and a base station 106. One or more of the electronic devices 102A-C may include, may be a component of, and/or may be referred to as, a User Equipment (UE), station (STA), or terminal device. One or more of the electronic devices 102A-C may include suitable logic, circuitry, interfaces, memory, and/or code that enables communications, e.g., with one or more of the wireless access point 104 or the base station 106, via wireless interfaces and utilizing one or more radio transceivers, such as WiFi and/or cellular transceivers. One or more of the electronic devices 102A-C may also be operable to communicate wirelessly with one or more other user devices, one or more other base stations, and/or one or more other access points not shown in FIG. 1.

One or more of the electronic devices 102A-C may be, for example, a portable computing device such as a laptop device, a smartphone, a peripheral device (e.g., a digital camera, headphones), a smart television device, a tablet device, a wearable device such as a watch, a band, and the like, or any other appropriate device that includes, for example, one or more wireless interfaces, such as wireless local area network (WLAN) radios, Wi-Fi radios, cellular radios, Bluetooth radios, Zigbee radios, near field communication (NFC) radios, and/or other wireless radios. In FIG. 1, by way of example, the electronic device 102A is depicted as a tablet device, the electronic device 102B is depicted as a mobile device, and the electronic device 102C is depicted as a laptop device. One or more of the electronic devices 102A-C may be, and/or may include all or part of, the electronic device discussed below with respect to FIG. 2, and/or the electronic system discussed below with respect to FIG. 6.

The base station 106 may be a component of, and/or may be referred to as, a cell, a node B (NB), an evolved universal mobile telecommunications system (UMTS) terrestrial radio access network (E-UTRAN) node B, an evolved nodeB (eNodeB or eNB), and the like. The base station 106 may include suitable logic, circuitry, interfaces, memory, and/or code that enable cellular communications, e.g., with one or more of the electronic devices 102A-C and/or other base stations (not shown), via wireless interfaces and utilize one or more radio transceivers.

In one or more implementations, the base station 106 may be a base station of a cellular-based wireless network, such as a long term evolution (LTE) communications network, global system for mobile (GSM) communications network, UMTS communications network, or generally any cellular-based communications network. The base station 106 may utilize an unlicensed spectrum for cellular communications, such as in a carrier aggregation procedure, e.g., in licensed assisted access (LAA) communication. Thus, the cellular communications may include communications over licensed spectrum, such as spectrum licensed by the mobile network operator associated with the base station 106, and/or communications over unlicensed spectrum, such as, for example, the 5 GHz spectrum. The base station 106 may be, and/or may include all or part of, the electronic device discussed below with respect to FIG. 2, and/or the electronic system discussed below with respect to FIG. 6.

The wireless access point 104 may include, may be a component of, and/or may be referred to as, a WLAN access point. The wireless access point 104 includes suitable logic, circuitry, interfaces, memory, and/or code that enable WiFi communications, e.g., with one or more of the electronic devices 102A-C via wireless interfaces and utilize one or more radio transceivers. The WiFi communications may include communications over one or more of a 2.4 GHz spectrum, a 5 GHz spectrum, a 60 GHz spectrum, and/or other spectrums utilized for WiFi communications. The wireless access point 104 may be, and/or may include all or part of, the electronic device discussed below with respect to FIG. 2, and/or the electronic system discussed below with respect to FIG. 6.

In FIG. 1, the electronic device 102B is illustrated as participating in cellular communications with the base station 106. However, the electronic device 102B may also participate in WiFi communications with the wireless access point 104, such as concurrently with the cellular communications with the base station 106. In one or more implementations, the electronic device 102B may participate in a licensed assisted access procedure with the base station 106 in order to utilized unlicensed spectrum (e.g., spectrum that is not licensed by any mobile network operator) for cellular communications, such as via carrier aggregation. Thus, if the electronic device 102B is located near one or more of the electronic devices 102A,C that are utilizing the 5 GHz spectrum for WiFi communications, e.g. with the wireless access point 104, the WiFi communications of the electronic devices 102A,C on the 5 GHz spectrum may interfere with the cellular communications of the electronic device 102B on the 5 GHz spectrum (and vice-versa).

In order to mitigate the interference between the cellular and WiFi communications over 5 GHz, one or more standards setting organizations, such as the European Telecommunications Standards Institute (ETSI), may stipulate that electronic devices 102A,C utilizing WiFi communications on 5 GHz channels reduce their channel occupancy time, such as from 13 ms to 6 ms. Thus, in this instance the amount of time that the electronic devices 102A,C spend on media/channel access procedures will more than double, since the electronic devices 102A,C may need to perform these procedures every 6 ms, instead of every 13 ms, thereby impacting the throughput achievable by the electronic devices 102A,C.

In the subject system, one or more of the electronic devices 102A,C, such as the electronic device 102A, utilizing WiFi communications on a 5 GHz channel may scan the channel for energy at or near media/channel access time in order to assess whether there are any interfering or jammer devices transmitting over the channel, such as the electronic device 102B that may be utilizing the channel for cellular communications. If the electronic device 102A detects energy on the channel, the electronic device 102A may set the channel occupancy time to a reduced amount of time, such as to the 6 ms that may be stipulated by one or more standards setting organizations. In this instance, the electronic device 102A accesses the channel for the reduced amount of time and may then need to re-perform the media/channel access procedures in order to continue to access the channel.

If the electronic device 102A does not detect energy on the channel, the electronic device 102A may set the channel occupancy time to the full channel access time, such as 13 ms. However, after accessing the channel for the reduced amount of time, such as 6 ms, the electronic device 102A may again scan the channel for energy, such as during a receive slot. If the electronic device 102A detects energy on the channel after accessing the channel for the reduced amount of time, the electronic device 102A may immediately turn off its transmit circuitry and/or radio frequency (RF) chain. In this manner, the electronic device 102A operates as if the channel occupancy time had been set to the reduced amount of time, such as 6 ms, even though the channel occupancy time was set to the full amount of time, such as 13 ms. An example timing diagram illustrating this scenario is discussed further below with respect to FIG. 5.

If the electronic device 102A does not detect energy on the channel after the accessing the channel for the reduced amount of time, the electronic device may continue to access the channel without re-performing the media/channel access procedures. In this manner, the electronic device 102A is able to avoid unnecessary media/channel access procedures while still mitigating interference with cellular communications on the 5 GHz channel (e.g., when energy is detected on the channel). An example timing diagram illustrating this scenario is discussed further below with respect to FIG. 4, and an example adaptive channel access process that may be performed by the electronic device 102A is discussed further below with respect to FIG. 3.

Thus, the subject system enables the electronic device 102A to adaptively set/modify channel occupancy time based on whether any other communications are detected on the channel, thereby allowing the electronic device 102A to avoid unnecessary media/channel access procedures, e.g. when no electronic devices utilizing cellular communications are detected on the channel, while also mitigating interference (and complying with any policies stipulated by one or more standards setting organizations) when electronic devices utilizing cellular communications are detected on the channel.

Figure 2:
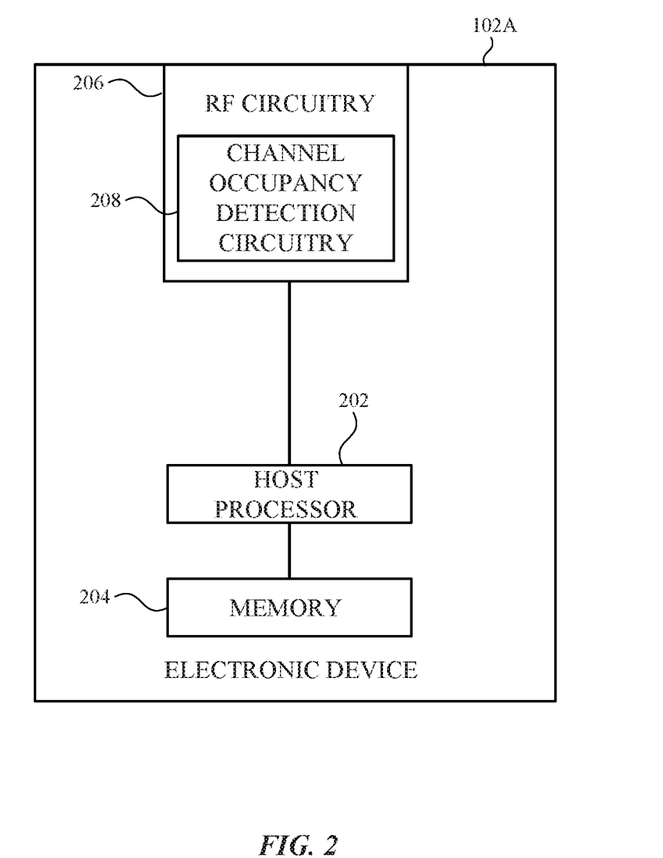
FIG. 2 illustrates an example electronic device that may be used in an adaptive channel access system in accordance with one or more implementations.

FIG. 2 illustrates an example electronic device 102A that may be used in an adaptive channel access system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided. In one or more implementations, one or more components of the example electronic device 102A may be implemented by one or more the electronic devices 102B-C, the wireless access point 104, and/or the base station 106.

The electronic device 102A may include, among other components, a host processor 202, a memory 204, and RF circuitry 206. The RF circuitry 206 may include channel occupancy detection circuitry 208. The host processor 202, which may also be referred to as an application processor or a processor, may include suitable logic, circuitry, and/or code that enables processing data and/or controlling operations of the electronic device 102A. In this regard, the host processor 202 may be enabled to provide control signals to various other components of the electronic device 102A.

The host processor 202 may also control transfers of data between various portions of the electronic device 102A. Additionally, the host processor 202 may enable implementation of an operating system or otherwise execute code to manage operations of the electronic device 102A. The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

The RF circuitry 206 may include suitable logic circuitry and/or code that may be operable to transmit and receive one or more types of wireless signals, such as WiFi signals, cellular signals, and the like. For example, the RF circuitry 206 may include an RF front end, a baseband processor, and/or one or more other components that facilitate wireless communications.

The channel occupancy detection circuitry 208 may include suitable logic circuitry and/or code that may be operable to scan a channel for energy, perform jammer detection, and/or otherwise determine whether any other electronic devices are transmitting on a given channel. In one or more implementations, the channel occupancy detection circuitry 208 may determine that another electronic device is transmitting on the given channel when the amount of energy detected satisfies a detection factor, or a detection threshold. In one or more implementations, the channel occupancy detection circuitry 208 may detect any signals on a given channel and determine whether a signal strength (e.g., based on a received signal strength indication (RSSI)) of any of the signals satisfies a particular detection factor or detection threshold to determine whether any other devices are transmitting on the channel. In one or more implementations, the channel occupancy detection circuitry 208 may be standalone circuitry of the RF circuitry 206, or the channel occupancy detection circuitry 208 may be implemented, at least in part, by the baseband processor.

In one or more implementations, one or more of the host processor 202, the memory 204, the RF circuitry 206, the channel occupancy detection circuitry 208, and/or one or more portions thereof, may be implemented in software (e.g., subroutines and code), hardware (e.g., an ASIC, an FPGA, a PLD, a controller, a state machine, gated logic, discrete hardware components, or any other suitable devices) and/or a combination of both.

Figure 3:
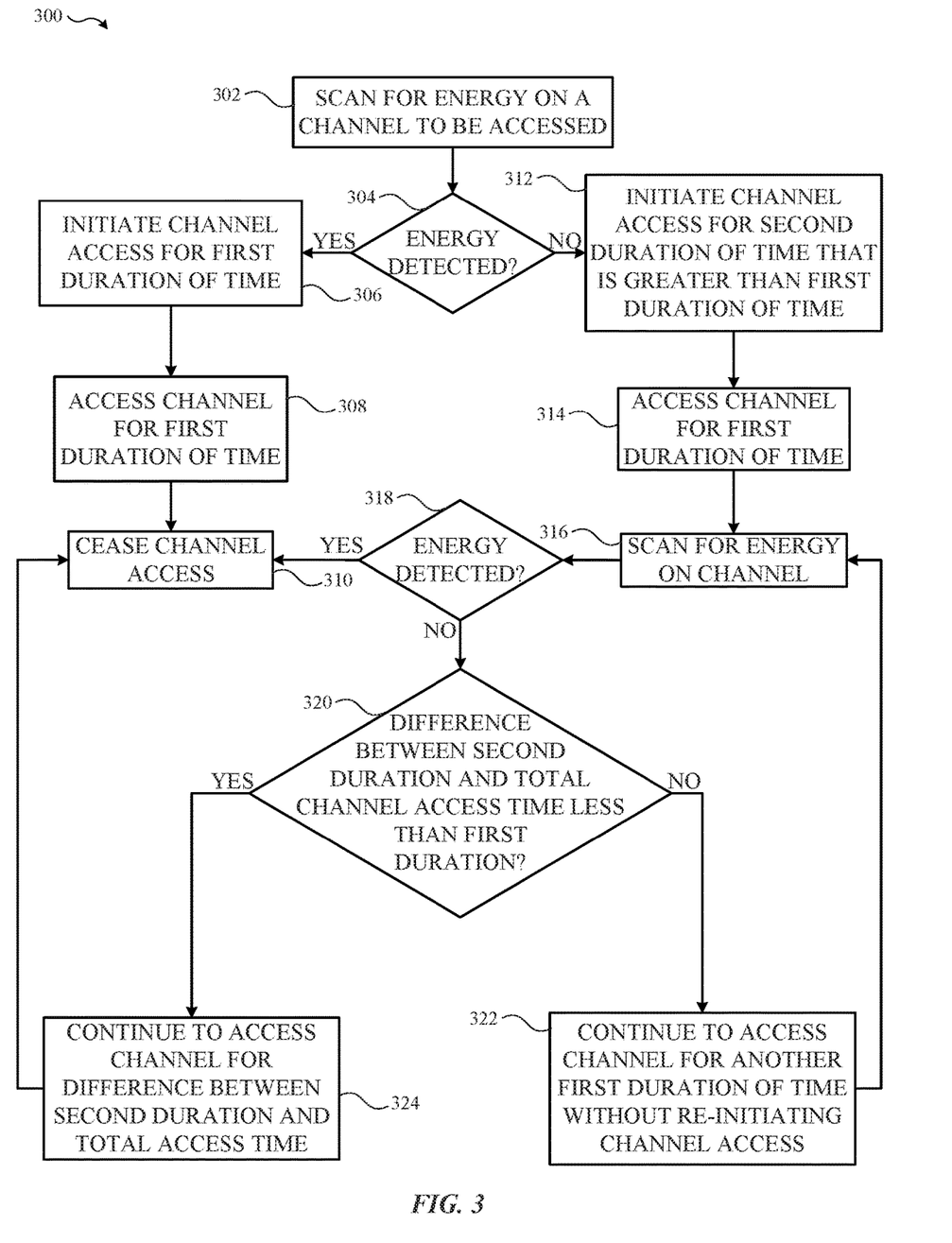
FIG. 3 illustrates a flow diagram of an example process of adaptive channel access by an electronic device in accordance with one or more implementations.

FIG. 3 illustrates a flow diagram of an example process 300 of adaptive channel access by an electronic device 102A in accordance with one or more implementations. For explanatory purposes, the process 300 is primarily described herein with reference to the electronic device 102A of FIG. 1. However, the process 300 is not limited to the electronic device 102A of FIG. 1, and one or more blocks (or operations) of the process 300 may be performed by one or more components or chips of the electronic device 102A. The electronic device 102A is also presented as an exemplary device and the operations described herein may be performed by any suitable device, such as one or more of the electronic devices 102B-C. Further for explanatory purposes, the blocks of the process 300 are described herein as occurring in serial, or linearly. However, multiple blocks of the process 300 may occur in parallel. In addition, the blocks of the process 300 need not be performed in the order shown and/or one or more blocks of the process 300 need not be performed and/or can be replaced by other operations.

The process 300 may be initiated when the electronic device 102A initiates, or is about to initiate, a media/channel access for a given channel that is in a spectrum that is utilized for another type of communication, such as cellular communication (e.g., over 5 GHz); the electronic device 102A scans for energy on the channel to be accessed (302). In one or more implementations, the electronic device 102A may scan for energy before initiating the media/channel access and/or the electronic device 102A may scan for energy during or after initiating the media/channel access.

If the electronic device 102A detects energy while scanning the channel (304), the electronic device 102A initiates the channel access for a first duration of time, such as by setting the channel occupancy time for the channel access to the first duration of time, e.g., 6 ms (306). In one or more implementations, initiating the channel access may include exchanging request to send (RTS) and clear to send (CTS) frames, random backoffs and/or other media access procedures. The electronic device 102A may indicate the channel occupancy time in the RTS frame. Example media/channel access procedures are discussed further below with respect to FIGS. 4 and 5.

The electronic device 102A may then access the channel for the first duration of time (308), such as by transmitting/receiving packets over the channel for the first duration of time. For example, the electronic device 102A may transmit packets to and/or receive packets from, the electronic device 102C over the channel. After accessing the channel for the first duration of time (308), the electronic device 102A may cease to access the channel, such as by turning off its transmit circuitry and/or RF chain. The electronic device 102A may repeat the process 300 if additional channel access time is needed.

If the electronic device 102A does not detect energy when scanning the channel (304), the electronic device 102A initiates channel access for a second duration of time that is greater than the first duration of time, such as by setting the channel occupancy time for the channel access to the second duration of time, e.g. 13 ms (312). The electronic device 102A may then access the channel for the first duration of time, e.g. 6 ms (314). Thus, even though the electronic device 102A has set the channel occupancy time to the second duration of time, the electronic device 102A initially only accesses the channel for the first duration of time.

After accessing the channel for the first duration of time (314), the electronic device 102A again scans the channel for energy (316). In one or more implementations, the electronic device 102A may perform the scan in-between packet transmissions, such as during an interpacket gap, and/or the electronic device 102A may perform the scan during a receive slot. If the electronic device 102A detects energy on the channel (318), the electronic device 102A immediately ceases to access the channel (310), such as by turning off its transmit circuitry and/or RF chain (310). The electronic device 102A may repeat the process 300 if additional channel accesses are needed.

If the electronic device 102A does not detect energy on the channel (318) during the second duration of time, the electronic device 102A determines whether the difference between the second duration of time and the total channel access time for the process 300 is less than the first duration of time (320). If, for example, the second duration of time is 13 ms, and the first duration of time is 6 ms, then the difference between the second duration (e.g., 13 ms), and the total access time for the process 300 at this stage, (e.g., 6 ms) would be 7 ms, which is greater than the first duration of time (e.g., 6 ms).

If the difference is greater than the first duration of time (320), the electronic device 102A continues to access the channel for another first duration of time without re-initiating the channel for access, e.g., without re-performing the media/channel access procedures (322). In one or more implementations, another first duration of time may instead be a third duration of time which may differ from (or be the same as) the first duration of time. After the electronic device 102A has accessed the channel for another first duration of time (322), the electronic device 102A again scans the channel for energy (316).

If the electronic device 102A again does not detect energy on the channel (318), the electronic device 102A determines whether the difference between the second duration of time and the total access time for the process 300 at this stage is less than the first duration of time (320). In the present example, since the electronic device has accessed the channel for two first durations of time (e.g. two times 6 ms), the difference between the second duration of time (e.g., 13 ms), and the total access time at this stage (e.g., 12 ms) would be 1 ms, which would be less than the first duration of time (e.g., 6 ms).

Thus, since the electronic device 102A has determined that the difference is less than the first duration of time (320), the electronic device 102A continues to access the channel for the difference between the second duration and the total access time (324), which is the remaining amount of time left in the channel occupancy period. After accessing the channel for the remaining amount of time left in the channel occupancy period (324), the electronic device 102A ceases to access the channel, such as by turning off its transmit circuitry and/or RF chain. The electronic device 102A may repeat the process 300 if additional channel accesses are needed.

Thus, upon completing step 324, the electronic device 102A has accessed the channel for the entire channel occupancy period (e.g., set to the second duration of time), while also having scanned for energy after the expiration of each first duration of time (e.g., 6 ms). In this manner the electronic device 102A has avoided performing unnecessary media/channel access procedures while also having ensured that interference with any cellular communications over the same channel is minimized, e.g., in the manner stipulated by one or more standards setting organizations.

Figure 4:
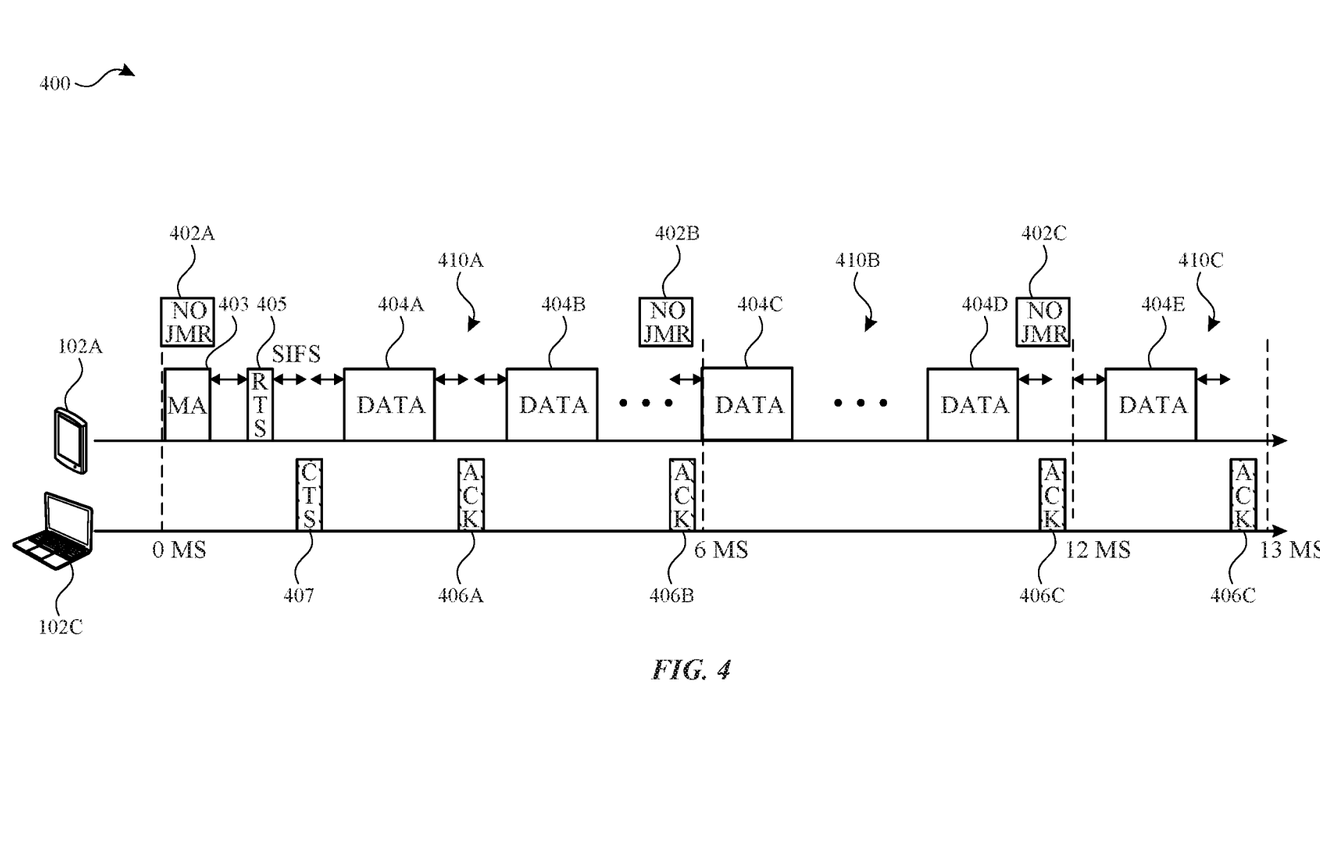
FIG. 4 illustrates a timing diagram of adaptive channel access without detecting jammer devices in accordance with one or more implementations.

FIG. 4 illustrates a timing diagram 400 of adaptive channel access without detecting jammer devices in accordance with one or more implementations. For explanatory purposes, the adaptive channel access is described in the timing diagram 400 with reference to the electronic devices 102A,C of the example network environment 100 of FIG. 1; however, the adaptive channel access is not limited to the electronic devices 102A,C of the example network environment 100 of FIG. 1, for example, the wireless access point 104 and/or the electronic device 102B may also perform adaptive channel access. Further for explanatory purposes, the electronic device 102A is depicted as performing the adaptive channel access in the timing diagram 400; however, the electronic device 102B may also perform adaptive channel access.

In the timing diagram 400, the electronic device 102A performs a media/channel access procedure 403 in order to access a channel, such as a WiFi channel, to transmit data packets 404A-E to the electronic device 102C. The channel may be a WiFi channel that is also utilized for cellular communications, such as channel on the 5 GHz spectrum. Before, during, or after the media/channel access procedure 403, the electronic device 102A performs a scan for energy on the channel and determines that there are no jamming signals on the channel (402A). Thus, the electronic device 102A sets the channel occupancy time for the channel access equal to the sum of the first duration of time 410A, the second duration of time 410B, and the third duration of time 410C, which equals 13 ms in the timing diagram 400.

The electronic device 102A transmits a request to send frame 405 to the electronic device 102C. In one or more implementations, the request to send frame 405 may indicate the channel occupancy time for the channel access. Although the request to send frame 405 is illustrated as being transmitted to the electronic device 102C, the request to send frame 405 may be broadcast to any other electronic devices on the same WLAN network as the electronic device 102A. In this manner, the other electronic devices in the WLAN network know not to transmit frames during the channel access time indicated in the request to send frame 405.

However, since the electronic device 102B is not part of the WLAN network, the electronic device 102B does not receive the request to send frame 405 from the electronic device 102A, and therefore the electronic device 102B does not know when the electronic device 102A may be utilizing a particular 5 GHz channel for WiFi communications. Similarly, the electronic device 102A may not know when the electronic device 102B may be utilizing a particular 5 GHz channel for cellular communications, and therefore interference may occur.

The electronic device 102C receives the request to send frame 405 and replies with a clear to send frame 407 indicating that the channel is clear for the electronic device 102A to access. Thus, the media/channel access procedure 403 and exchanging the frames 405, 407, may be part or all of a set of procedures for initiating the channel for access by the electronic device 102A. The electronic device 102A receives the clear to send frame 407 and begins accessing the channel, e.g., transmitting the data packets 404A-B. The electronic device 102C may receive the data packets 404A-B and may respond with acknowledgment packets 406A-B. There may be a gap between each of the data packets 404A-B which may be referred to as a short interframe space (SIFS).

After the electronic device 102A has accessed the channel for a portion of the channel occupancy time, such as immediately prior to the expiration of the first duration of time 410A in FIG. 4, the electronic device 102A again scans for energy on the channel and determines that there are no jamming signals on the channel (402B). In one or more implementations, the first duration of time may be selected, for example, based on a channel occupancy time stipulated by a standards setting organization for mitigating interference between cellular and WiFi communications on the same channel. However, the first duration of time can be any amount of time that is less than the total channel occupancy time.

Since the electronic device 102A did not detect any energy on the channel (402B), the electronic device 102A continues to access the channel for the second duration of time 410B, which is illustrated in the timing diagram 400 as being the same as the first duration of time 410A. However, in one or more implementations, the second duration of time 410B may be different than the first duration of time 410A. In one or more implementations, if the electronic device 102A had detected energy on the channel (402B), the electronic device 102A would have immediately turned off its transmit circuitry, as is discussed further below with respect to FIG. 5.

After transmitting the data packets 404C-D and receiving the acknowledgment 406C, and after an additional portion of the channel occupancy time has elapsed, or is about to elapse, such as immediately prior to the expiration of the second duration of time 410B in FIG. 4, the electronic device 102A again scans for energy on the channel and determines that there are no jamming signals on the channel (402C).

Since the electronic device 102A did not detect any jamming signals on the channel (402C), and since the difference between the channel occupancy time and the total channel access time is less than the first duration of time, the electronic device 102A continues to access the channel for the third duration of time 410C, which is the remainder of the channel occupancy time. For example, the electronic device 102A transmits the data packet 404E and receives the acknowledgment 406C. If the electronic device 102A had detected energy on the channel (402C), the electronic device 102A would have immediately turned off its transmit circuitry, as is discussed further below with respect to FIG. 5.

Thus, in the timing diagram 400, since the electronic device 102A does not detect any other electronic devices utilizing the channel, such as for cellular communications, the electronic device 102A is able to utilize the entire channel occupancy time without having to re-perform the media/channel access procedures 403, 405.

Figure 5:
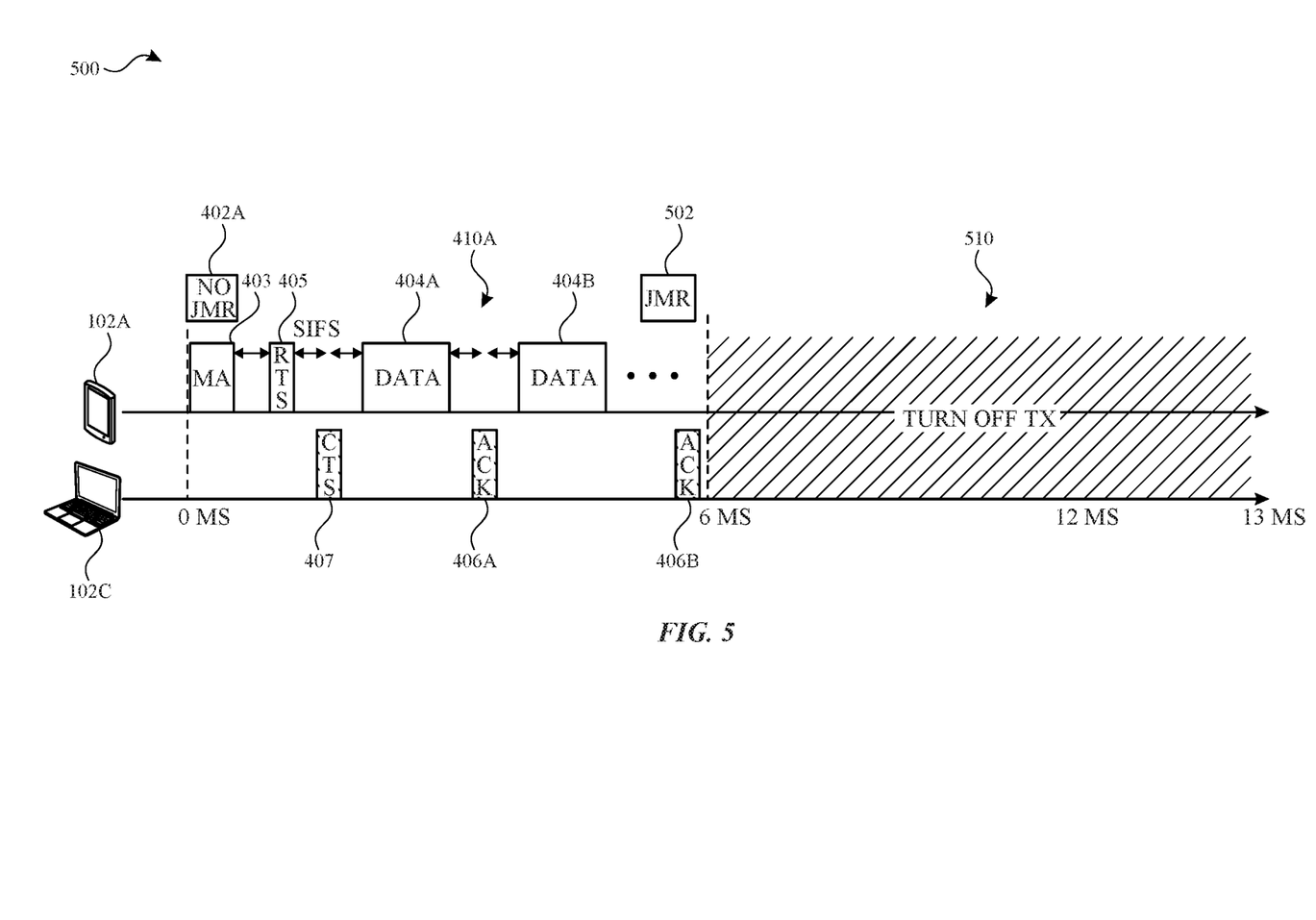
FIG. 5 illustrates a timing diagram of adaptive channel access with detection of a jammer device in accordance with one or more implementations.

FIG. 5 illustrates a timing diagram 500 of adaptive channel access with detection of a jammer device in accordance with one or more implementations. For explanatory purposes, the adaptive channel access is described in the timing diagram 500 with reference to the electronic devices 102A,C of the example network environment 100 of FIG. 1; however, the adaptive channel access is not limited to the electronic devices 102A,C of the example network environment 100 of FIG. 1; for example, the wireless access point 104 and/or the electronic device 102B may also perform adaptive channel access. Further for explanatory purposes, the electronic device 102A is depicted as performing the adaptive channel access in the timing diagram 500; however, the electronic device 102B may also perform adaptive channel access.

The timing diagram 500 is the same as the timing diagram 400 for the first duration of time 410A, except that when the electronic device 102A scans the channel for energy at or near the end of the first duration of time 410A, the electronic device 102A detects a jamming signal (502), such as a signal transmitted by an electronic device that is utilizing the channel for cellular communications. Accordingly, the electronic device 102A immediately ceases accessing the channel, such as by turning of its transmit circuitry and/or RF chain for the remainder of the channel occupancy time 510 (which may be equivalent to the sum of the second and third durations of time 410B-C of the timing diagram 400).

Figure 6:
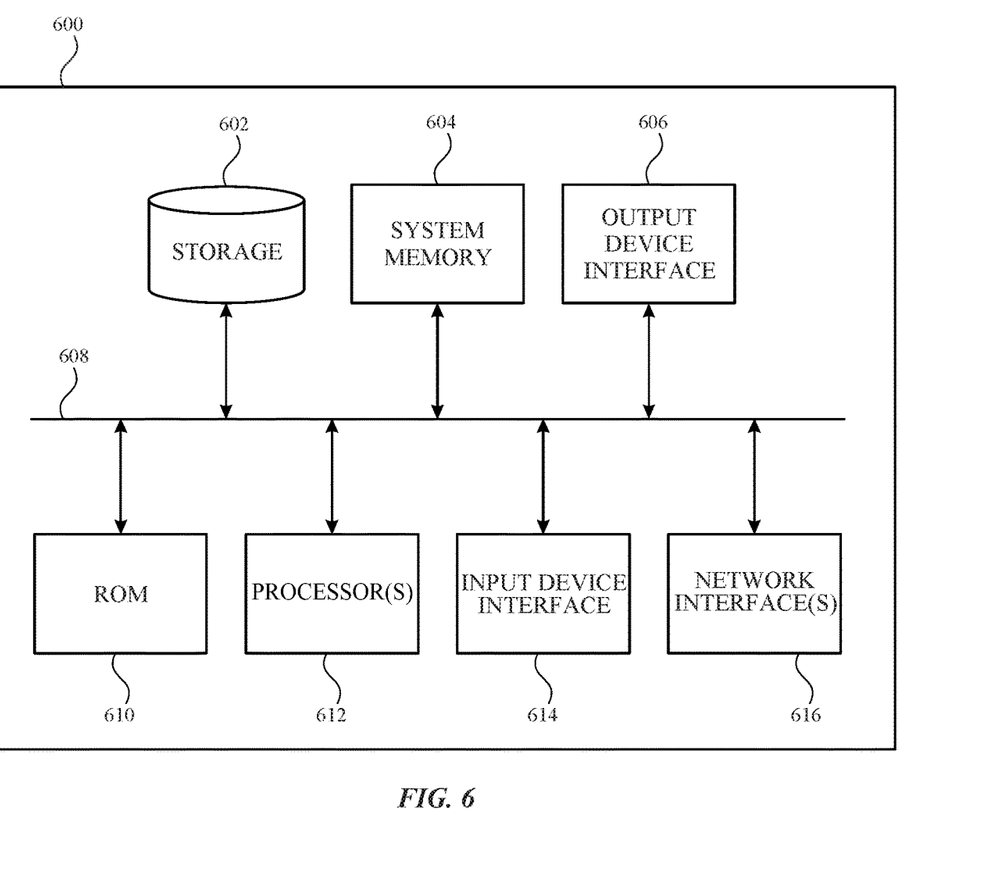
FIG. 6 illustrates an example electronic system with which aspects of the subject technology may be implemented in accordance with one or more implementations.

FIG. 6 illustrates an electronic system 600 with which one or more implementations of the subject technology may be implemented. The electronic system 600 can be, and/or can be a part of, one or more of the electronic devices 102A-C, the wireless access point 104, and/or the base station 106 shown in FIG. 1. The electronic system 600 may include various types of computer readable media and interfaces for various other types of computer readable media. The electronic system 600 includes a bus 608, one or more processing unit(s) 612, a system memory 604 (and/or buffer), a ROM 610, a permanent storage device 602, an input device interface 614, an output device interface 606, and one or more network interfaces 616, or subsets and variations thereof.

The bus 608 collectively represents all system, peripheral, and chipset buses that communicatively connect the numerous internal devices of the electronic system 600. In one or more implementations, the bus 608 communicatively connects the one or more processing unit(s) 612 with the ROM 610, the system memory 604, and the permanent storage device 602. From these various memory units, the one or more processing unit(s) 612 retrieves instructions to execute and data to process in order to execute the processes of the subject disclosure. The one or more processing unit(s) 612 can be a single processor or a multi-core processor in different implementations.

The ROM 610 stores static data and instructions that are needed by the one or more processing unit(s) 612 and other modules of the electronic system 600. The permanent storage device 602, on the other hand, may be a read-and-write memory device. The permanent storage device 602 may be a non-volatile memory unit that stores instructions and data even when the electronic system 600 is off. In one or more implementations, a mass-storage device (such as a magnetic or optical disk and its corresponding disk drive) may be used as the permanent storage device 602.

In one or more implementations, a removable storage device (such as a floppy disk, flash drive, and its corresponding disk drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory. The system memory 604 may store any of the instructions and data that one or more processing unit(s) 612 may need at runtime. In one or more implementations, the processes of the subject disclosure are stored in the system memory 604, the permanent storage device 602, and/or the ROM 610. From these various memory units, the one or more processing unit(s) 612 retrieves instructions to execute and data to process in order to execute the processes of one or more implementations.

The bus 608 also connects to the input and output device interfaces 614 and 606. The input device interface 614 enables a user to communicate information and select commands to the electronic system 600. Input devices that may be used with the input device interface 614 may include, for example, alphanumeric keyboards and pointing devices (also called "cursor control devices"). The output device interface 606 may enable, for example, the display of images generated by electronic system 600. Output devices that may be used with the output device interface 606 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, the bus 608 also couples the electronic system 600 to one or more networks and/or to one or more network nodes, through the one or more network interface(s) 616. In this manner, the electronic system 600 can be a part of a network of computers (such as a LAN, a wide area network ("WAN"), or an Intranet, or a network of networks, such as the Internet. Any or all components of the electronic system 600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
    performing a first scan for energy on a channel to be accessed;
    in response to detecting energy on the channel by the first scan, accessing the channel for a first duration of time; and
    in response to not detecting energy on the channel by the first scan:
        initiating access of the channel for a second duration of time that is greater than the first duration of time,
        accessing the channel and performing a second scan for energy on the channel before the first duration of time elapses, and
        in response to detecting energy on the channel by the second scan, ceasing to access the channel prior to the second duration of time elapsing, otherwise, in response to not detecting energy is on the channel by the second scan, continuing to access the channel for a third duration of time without re-initiating access of the channel.

2. The method of claim 1, wherein the third duration of time equals the first duration of time.

3. The method of claim 2, wherein continuing to access the channel for the third duration of time further comprises:
    continuing to access the channel for the third duration of time and responsively performing a third scan for energy on the channel, wherein in response to determining that energy is detected on the channel by the third scan, ceasing to access the channel, otherwise, in response to determining that the third scan does not detect energy on the channel, continuing to access the channel for a fourth duration of time.

4. The method of claim 3, wherein in response to a difference between the second duration of time and a sum of the first duration of time and the third duration of time being less than the first duration of time, the fourth duration of time is set to the difference, otherwise, the fourth duration of time is set to the first duration of time.

5. The method of claim 4, wherein in response to setting the fourth duration of time is set to the difference, ceasing to access the channel after accessing the channel for the fourth duration of time.

6. The method of claim 1, wherein energy is detected on the channel by determining that an amount of energy detected on the channel satisfies a detection factor.

7. The method of claim 1, wherein initiating access of the channel for the second duration of time comprises:
transmitting, from a first device and to a second device, a request to send frame over the channel, wherein the request to send frame indicates that a channel occupancy time is set to the second duration of time; and
receiving, by the first device and from the second device a clear to send frame over the channel.

8. The method of claim 7, wherein performing the first scan for energy on the channel to be accessed comprises performing, by the first device, the first scan for energy on the channel to be accessed, and accessing the channel for the first duration of time comprises transmitting, by the first device, packets over the channel to the second device.

9. The method of claim 1, wherein the second scan for energy on the channel is performed prior to the first duration of time elapsing.

10. The method of claim 1, wherein performing the second scan for energy on the channel is performed after the first duration of time elapses.

11. The method of claim 1, wherein performing the second scan for energy on the channel is performed during at least one of a receive slot, a media access time, or a gap between packets.

12. The method of claim 1, wherein the channel is to be accessed for wireless local area network communications and the first scan is performed to detect cellular communications on the channel.

13. A device comprising:
transmit circuitry; and
at least one processor configured to:
    initiate access of a channel;
    determine whether the channel is occupied by any other devices;
    in response to determining that the channel is occupied by at least one other device, access the channel using the transmit circuitry with a channel occupancy time set to a first duration of time; and
    in response to determining that the channel is not occupied by any other devices:
        access the channel using the transmit circuitry with the channel occupancy time set to a second duration of time that is greater than the first duration of time,
        during access of the channel with the channel occupancy time set to the second duration of time, determine whether the channel is occupied by any other devices, and
        in response to determining that the channel is occupied by the at least one other device during the access of the channel with the channel occupancy time set to the second duration of time, cease accessing the channel using the transmit circuitry prior to the second duration of time elapsing, otherwise continue to access the channel using the transmit circuitry without re-initiating the access of the channel.

14. The device of claim 13, wherein the at least one processor is further configured to:
determine, during the access of the channel with the channel occupancy time set to the second duration of time, whether the channel is occupied by any other devices after expiration of the first duration of time.

15. The device of claim 13, wherein the at least one processor is configured to cease to access the channel using the transmit circuitry by turning off the transmit circuitry.

16. The device of claim 13, wherein the transmit circuitry comprises wireless local area network transmit circuitry and the at least one processor is configured to access the channel using the transmit circuitry by transmitting, using the wireless local area network transmit circuitry, at least one packet.

17. The device of claim 16, wherein the at least one processor is configured to determine whether the channel is occupied by any other devices utilizing cellular transmissions.

18. The device of claim 13, wherein accessing the channel using the transmit circuitry comprises transmitting packets over the channel using the transmit circuitry.

19. A non-transitory computer-readable medium comprising instructions that, when executed by processor circuitry, cause the processor circuitry to perform operations comprising:
initiating access of a channel;
performing a first jammer detection operation on the channel;
in response to detecting a jamming device on the channel by the first jammer detection operation, accessing the channel with a channel occupancy time set to a first duration; and
in response to detecting no jamming device on the channel by the first jammer detection operation:
    accessing the channel with the channel occupancy time set to a second duration that is greater than the first duration,
    while accessing the channel with the channel occupancy time set to the second duration, perform a second jammer detection operation on the channel, and
    in response to detecting a jamming device on the channel by the second jammer detection operation, ceasing accessing the channel prior to expiration of the second duration, otherwise continuing to access the channel without re-initiating access of the channel.

20. The non-transitory computer-readable medium of claim 19, wherein ceasing accessing the channel prior to the expiration of the second duration comprises ceasing accessing the channel after an expiration of the first duration and prior to the expiration of the second duration.

21. The non-transitory computer-readable medium of claim 19, wherein the channel is utilized for WiFi communications and the performing the first jammer detection operation on the channel comprises performing the first jammer detection operation on the channel to detect cellular communications on the channel.

* * * * *

UNITED STATES PATENT AND TRADEMARK OFFICE
CERTIFICATE OF CORRECTION

PATENT NO. : 11,159,266 B2
APPLICATION NO. : 16/107763
DATED : October 26, 2021
INVENTOR(S) : Xi Yang et al.

Page 1 of 1

It is certified that error appears in the above-identified patent and that said Letters Patent is hereby corrected as shown below:

In the Claims

Column 14, Line 62 (Claim 5): Remove "is set".

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*